Nov. 18, 1958  J. M. GUTHRIE  2,860,990
TREATING OF HAMS
Filed Sept. 15, 1955
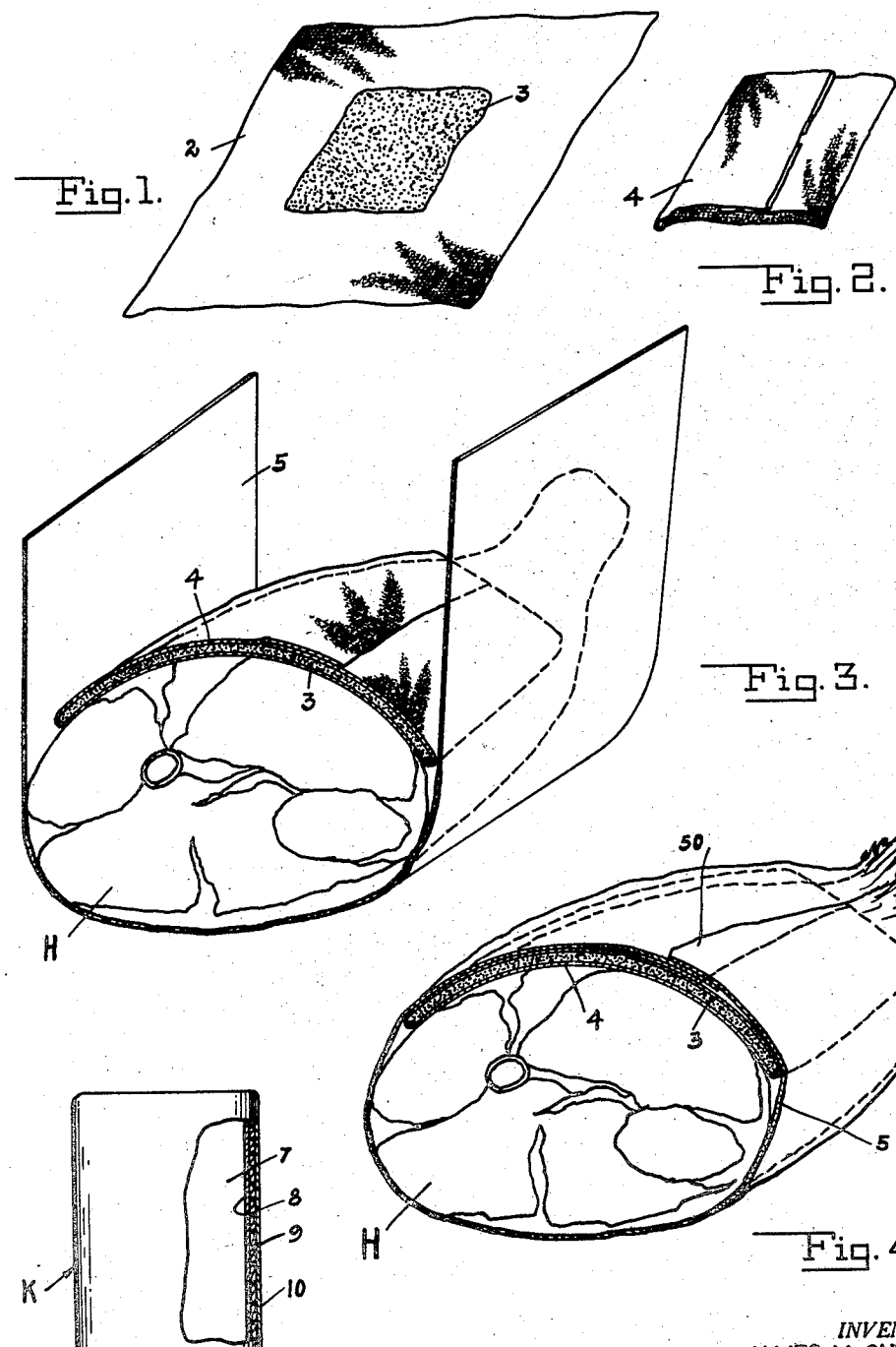
INVENTOR.
JAMES M. GUTHRIE.
BY
Christy, Parmelee and Strickland
his ATTORNEYS.

United States Patent Office 2,860,990
Patented Nov. 18, 1958

2,860,990

TREATING OF HAMS

James M. Guthrie, Crafton, Pa.

Application September 15, 1955, Serial No. 534,428

4 Claims. (Cl. 99—107)

My invention relates to the preparation of hams for the table, and comprises certain new and useful improvements in a method of and means for so preparing hams.

The object of the invention is to improve the edibility and flavor of hams that are baked or roasted, and to facilitate the preparation of hams for the oven. A further object is to provide for an improved distribution of flavoring and seasoning ingredients throughout the bodies of roasted or baked hams. These and other objects will be understood upon considering the following specification.

In accordance with my invention a thick pad or blanket, formed of a dry soluble mixture of sugar and spices enclosed in an envelope of highly pervious sheet or web material, such as cheese cloth, is applied upon the top of a ham that is otherwise ready for the oven. After the blanket has been applied and pressed into contact with the surface of the ham, liquid is poured upon the blanket, partially dissolving the dry mixture in the pervious envelope, and forming it into wet paste that in part slowly exudes through the envelope upon the surface and into the substance of the ham, and sets up an intimate tacky adherence of the blanket to the body of the ham. While the liquid used for this purpose may be water, or a solution or mixture of water with flavoring material, say Worcestershire sauce, I prefer to employ vinegar as the liquid, flavored with Worcestershire sauce.

For a ham of from eight to fourteen pounds in weight about one pound sugar-spice mixture is adequate, and one cup of vinegar, including four tablespoons of Worcestershire sauce, provides sufficient liquid for the stated purpose.

When the ham and its blanket has been thus prepared, a sheet of aluminum foil is wrapped and crimped upon the ham, with the overlapped edges of the foil positioned over the applied blanket, and the assembly is then placed in an open pan in an oven heated to a temperature in the order of from 300 to 400° F. although the particular temperature is a matter of choice with the cook. A lower temperature requires a longer period of baking and a higher temperature requires a shorter period.

Under oven heat the sugar in the paste is slowly liquefied and caused to seep through the pervious envelope of cheese cloth, carrying the spices and flavoring materials into the substance of the ham. The time required to bake a ham varies with weight of the ham and with the particular treatment given to the ham by the packer. In the case of hams sold as pre-cooked hams by the packers the baking time may vary from two to three hours for an eight pound ham, up to three and one-half or five hours for a fourteen pound ham.

About one-half hour before the end of the baking period, the overlapped edges of the applied jacket of aluminum foil are separated and spread aside to expose so much of the surface of the ham as possible, without removing the ham from the pan, and then the limp envelope of cheese cloth is removed, thereby exposing the body of the ham upon which, and into which, the sugar, the spices and the flavoring liquids have slowly seeped during the baking period. With the ham thus exposed in the pan, it is returned to the oven and baked for the final period of one-half hour, or more, to brown the ham and form a crust to desired degree. During this final period of baking the oven temperature is preferably advanced 50° F., say, above the temperature at which the initial baking was done.

In the accompanying drawings, I illustrate exemplary means in which, and in the use of which, the invention is realized. In the drawings:

Fig. 1 is an isometric view of a web or sheet of pervious material, upon which a thick layer of mixed sugar and spices is spread;

Fig. 2 is an isometric view of the pad or blanket formed by folding the other free edges of the web of fabric over and upon the layer of mixed sugar and spices;

Fig. 3 is an isometric view of a ham that has been cut on a medial, vertical plane to illustrate how the blanket is positioned, ready for a jacket of aluminum foil to be closed about the blanketed ham;

Fig. 4 is a view comparable with Fig. 3, showing the foil jacket closed, and the assembly ready to be placed in an open pan for baking; and Fig. 5 is a view of a package containing in marketable form the essential elements required for the practice of the invention, the view being partly in side elevation and partly in vertical section.

Referring to Fig. 1, I show a web or sheet 2 of cheese cloth, upon which a layer 3 of mixed dry sugar and spices is spread to a thickness of about ⅜ of an inch, and then the otherwise free edges of the cloth are folded over the layer 3, to envelope the layer and form a blanket of sugar and seasoning ingredients, as shown at 4 in Fig. 2. For the ordinary ham of from eight to fourteen pounds, the layer 3 is formed of one pound of brown sugar, one-eighth pound of dry mustard, three table spoons of ground cloves, two table spoons of cinnamon, and one teaspoon of salt of garlic. These ingredients are thoroughly mixed in the dry state and in such state are enveloped in the pervious web 2 of cheese cloth, or gauze, or a perforated web of cellophane or other suitable material. The various sorts of pervious material which may be used are contemplated by the term "cheese cloth" in the appended claims.

The ham H, in this case a so-called pre-cooked ham as purchased on the open market, is washed thoroughly, and the surface of the ham which is to face upwards during baking may be slit on crossed lines to the depth of the fat, whereby checkered areas of about ¾ of a square inch are defined by the slits. Then the blanket 4 is applied to the slit surface, as indicated in Fig. 3. Next, the blanketed ham is positioned in a sheet 5 of aluminum foil, and the assembly is placed in an open baking pan, not shown.

At this time a cup of vinegar, including preferably four tablespoons of Worcestershire sauce, is slowly poured on the blanket and allowed to soak into the enveloped mixture 3, with the effect already described. During the time the flavoring solution of vinegar and sauce is being applied the blanket 4 may be patted with the hand, to promote a rapid dissemination of the solution into the mixture 3, to augment the slow dissolving and exudation of the liquefied or pastey substance to the slit surface of the ham, and to effect an intimate contact of the blanket with the said surface of the ham. Thereafter, the foil 5 is pressed and crimped, to form a snug, relatively impervious jacket upon the blanketed ham, as will be understood upon reference to Fig. 4, it being noted that the overlapped edges 50 of the sheet of foil that forms the jacket are located at the top of the ham, immediately over the blanket 4.

The jacketed ham in the open pan is placed in an oven and baked and browned, or encrusted, in the manner described in the foregoing context.

The particular kinds and quantities of the spices and ingredients which are mixed dry with the sugar may be varied to suit the taste, as may also be the solution of the liquid which is used initially to wet and liquefy the mixture after the blanket has been applied to the ham. It may be noted that during the baking of the ham the liquefaction and exudation of the mixture is substantially completed under the thermal effect of oven heat.

In order to facilitate the enjoyment of my invention, I provide the essential means in the form of a kit K—a readily marketable article of commerce. That is to say, the dry mixture of sugar and seasoning ingredients is packaged in a box 7, as shown in Fig. 5, and around the box the sheet of foil, which is first folded into a band of suitable width, is wound or wrapped, providing a box-protecting reinforcement as indicated at 8. Over the wrapped foil the cheese cloth, also folded, is wound as at 9. The wrapping of cheese cloth protects the foil against damage during normal commercial handling of the product. And over the assembly an outer wrapping of cellophane 10, or of other suitable packaging material, is applied.

Within the terms of the appended claims, many variations and modifications will occur to those skilled in the art, without departing from the spirit of the invention defined.

This application is a continuation-in-part of my prior application, Serial No. 283,024, filed April 18, 1952, now abandoned.

I claim:

1. The method of preparing a ham for the oven which includes the steps of applying upon the surface of the ham a seasoning layer comprised of substantially dry sugar of about 3/8" in thickness retained in place on the ham in a blanket of cheese cloth, wetting the applied and blanketed layer with an edible liquid and thereby partially dissolving the sugar and forming on the ham a sticky heat-liquefiable paste that is adapted slowly to exude through the cheese cloth to the surface of the ham.

2. The method of preparing a ham for the oven which includes the steps of applying upon the surface of the ham a seasoning layer comprised of substantially dry sugar of about 3/8" in thickness retained in place on the ham in a blanket of cheese cloth, wetting the applied and blanketed layer with an edible liquid and thereby partially dissolving the sugar and forming on the ham a sticky heat-liquefiable paste that is adapted slowly to exude through the cheese cloth to the surface of the ham, and jacketing the ham with such applied paste in aluminum foil.

3. The method of preparing a ham for the table which includes the steps of applying upon the surface of the ham a seasoning layer comprised of substantially dry sugar of about 3/8" in thickness retained in place on the ham in a blanket of cheese cloth, wetting the applied and blanketed layer with an edible liquid and thereby partially dissolving the sugar and forming on the ham a sticky heat-liquefiable paste that is adapted slowly to exude through the cheese cloth to the surface of the ham, subjecting the blanketed ham to baking temperature and during a selected baking period substantially completing under thermal effect the liquefaction and exudation of said mixture, and at a substantial interval prior to the end of the baking period removing the cheese cloth and the contained residue from the ham.

4. The method of preparing a ham for the table which includes the steps of applying upon the surface of the ham a seasoning layer comprised of substantially dry sugar of about 3/8" in thickness retained in place on the ham in a blanket of cheese cloth, wetting the applied and blanketed layer with an edible liquid and thereby partially dissolving the sugar and forming on the ham a sticky heat-liquefiable paste that is adapted slowly to exude through the cheese cloth to the surface of the ham, jacketing the ham with such applied paste in aluminum foil, subjecting the jacketed ham to baking temperature and during a selected baking period substantially completing under thermal effect the liquefaction and exudation of said mixture, and at a substantial interval prior to the end of the baking period opening the aluminum jacket and removing the cheese cloth and the contained residue whereby to expose the surface of the ham to the immediate effect of oven heat.

References Cited in the file of this patent

UNITED STATES PATENTS

| | | |
|---|---|---|
| 2,277,050 | Reed et al. | Mar. 24, 1942 |
| 2,518,406 | Weber | Aug. 8, 1950 |
| 2,640,779 | George | June 2, 1953 |

OTHER REFERENCES

"Quick Frozen Foods," June 1950, page 71.